Oct. 7, 1969  W. V. MARBACH  3,471,305
PACKAGING OF SHIRRED FOOD CASINGS AND PACKAGE
Filed June 13, 1966  2 Sheets-Sheet 1
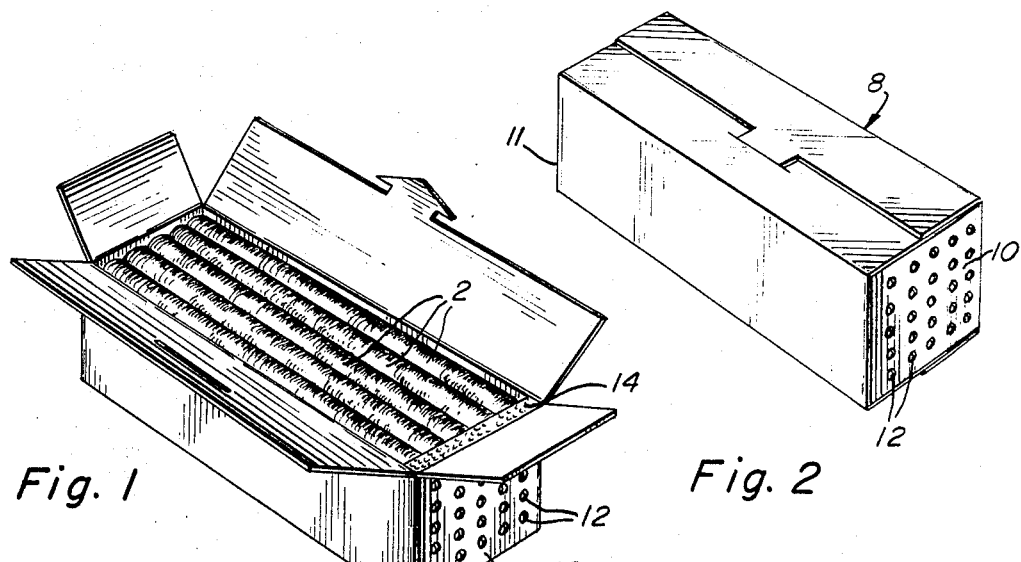
Fig. 1
Fig. 2
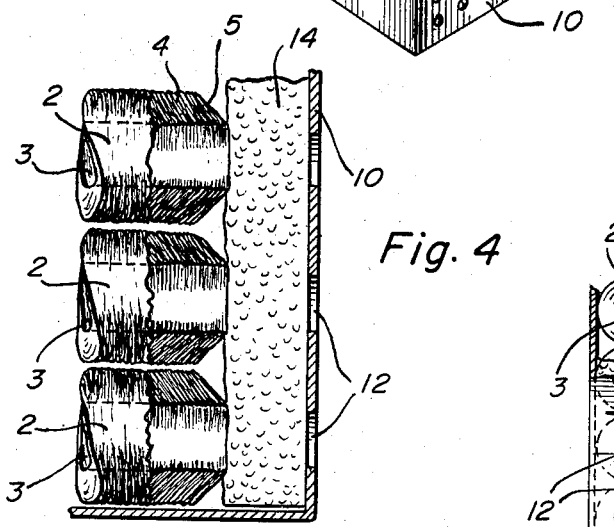
Fig. 4
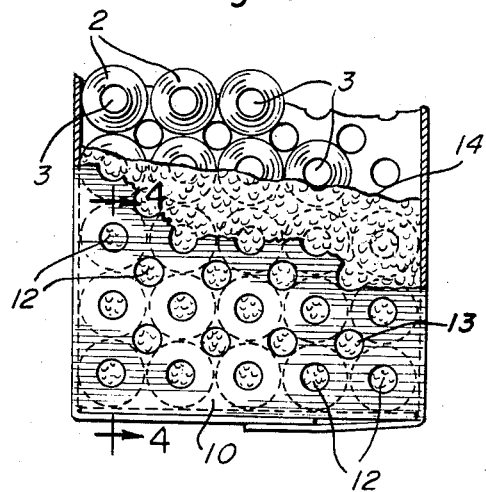
Fig. 3
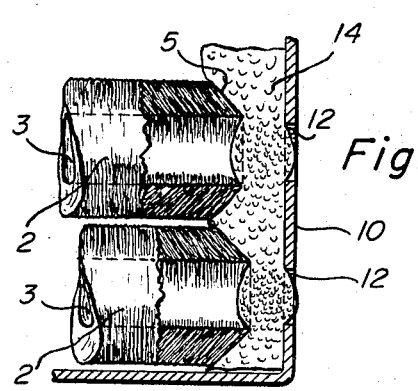
Fig. 5
INVENTOR.
WALTER V. MARBACH
BY

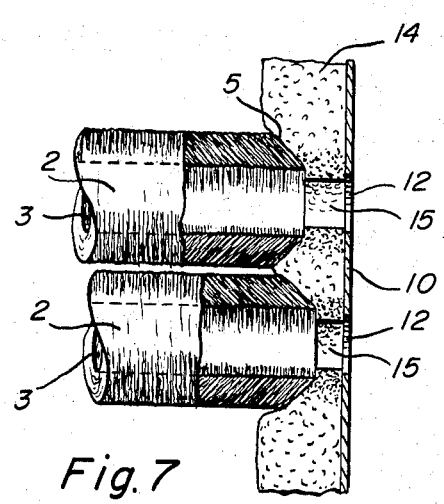
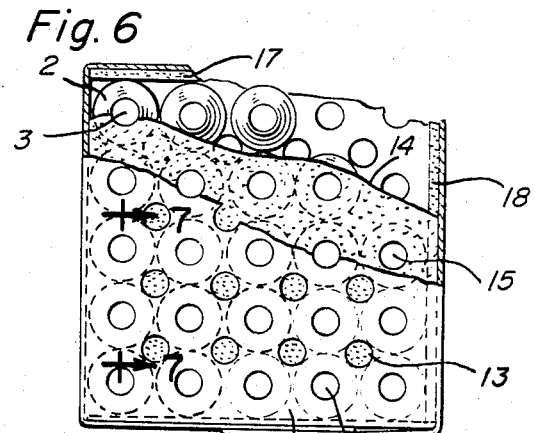
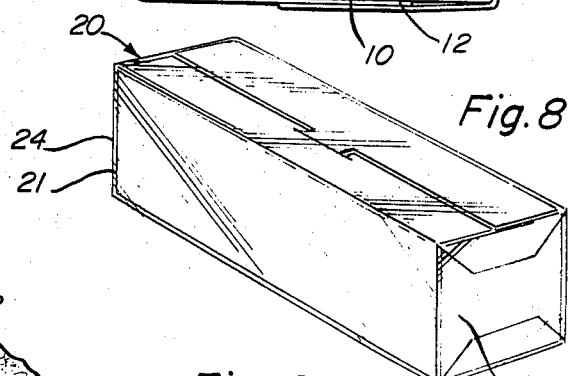
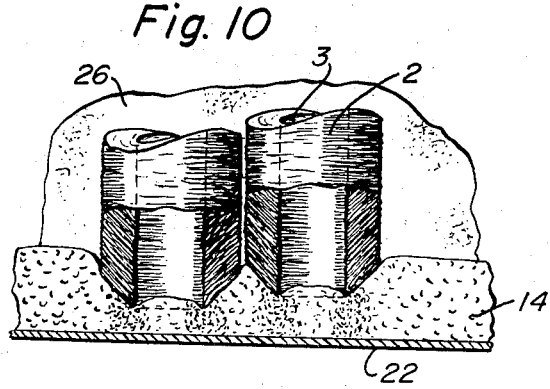
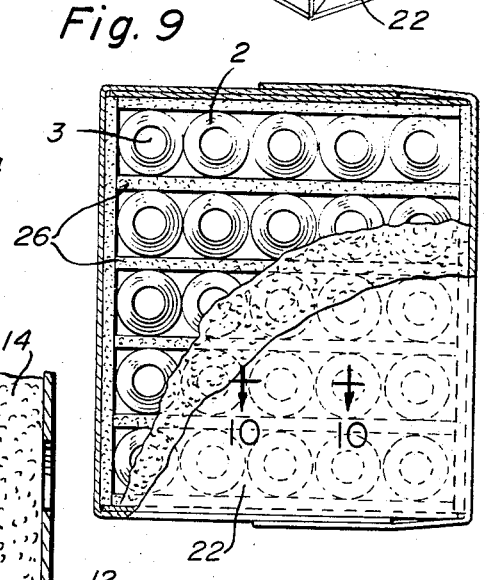
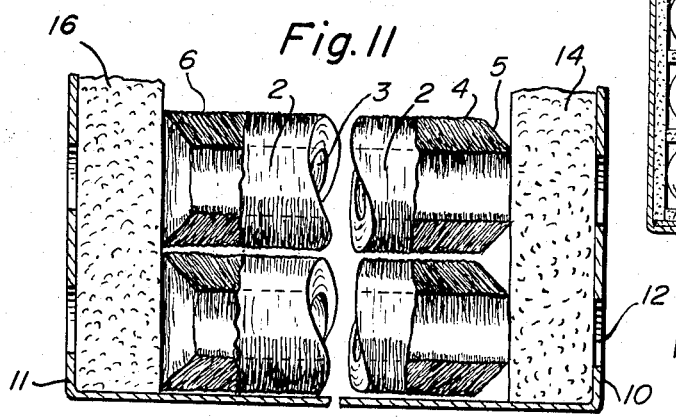

United States Patent Office 3,471,305
Patented Oct. 7, 1969

3,471,305
PACKAGING OF SHIRRED FOOD CASINGS AND PACKAGE
Walter V. Marbach, Palos Heights, Ill., assignor to Union Carbide Corporation, a corporation of New York
Filed June 13, 1966, Ser. No. 557,163
Int. Cl. A22c *13/00;* B65d *5/58*
U.S. Cl. 99—176    10 Claims

ABSTRACT OF THE DISCLOSURE

A package for packaging shirred, artificial food casings and a method for packaging shirred, artificial food casings are provided whereby the bores of the shirred food casings are retained unobstructed and in straight alignment and the packaged shirred food casings are permitted to expand as a result of being humidified without becoming distorted.

---

This invention relates to a carton having particular utility for packaging shirred and compressed lengths of synthetic food casings. More particularly, the invention relates to a carton of the type referred to in the sausage trade as a caddy, and hence such designation is employed hereinafter.

Unique problems are associated with the packaging of shirred and compressed food casings, arising both from the physical nature of such casings and from their manner of use.

Food casings, such as cellulose sausage casings, are conventionally made in continuous lengths and are thereafter shirred and compressed by various means well known in the art to obtain relatively rigid compressed tubular sticks. The length of these tubular sticks substantially correspond to the lengths of a stuffing horn through which a meat emulsion is subsequently fed into the casing. A typical method of shirring is described in U.S. Patent 2,984,574, Matecki. Typically a 40 to 80 foot or longer length of cellulose casing is shirred and compressed to yield a rigid tubular stick of between about 6 to 14 inches in length. Since the advent of automatic stuffing machines, such as that described in U.S. Patent 3,191,222, Townsend, casing lengths have increased to lengths of 160 feet or more and are shirred or compressed to yield rigid tubular sticks having compressed lengths of about 20 inches or more. In addition, the use of automatic stuffing machinery has necessitated innovations requiring one end of the shirred casing stick to be closed before insertion and packaging into the caddy. Upon removal of the casings from the caddy they are positioned in an automatic hopper feeder that positions each casing stick in turn on the stuffing horn. Any obstruction in the open end or non uniformity in the bore alignment of the casings causes breakage or jamming.

It is usually preferred to maintain the moisture content of the cellulose casing at a low level for the shirring operation and at a higher level for the stuffing operation. Consequently, it has been the practice to shirr and compress the casings, close one end of the stick to produce an air permeable closure and to package the shirred casing in a caddy in parallel rows in alignment with all closed ends of the casing at the same end of the caddy. The caddy is perforated to have ventilating openings in its vertical end panels, some of said openings or apertures registering with the bores of the shirred casings and other apertures registering with the space intermediate the area defined by the outer surfaces of each group of four adjacent casings. These apertures provide the means whereby external humid air can readily be caused to enter the package and humidify the casings to the desired extent. The shirred casings, upon being suitably humidified, are kept in this condition until used by wrapping the caddy with a wax treated paper or a plastic film or other suitable moisture-impervious wrapping material. Ventilated caddies conventionally used by the trade for packaging shirred casing are illustrated and described in U.S. Patents 2,181,329 and 3,028,952.

Another method of humidifying shirred casing is described in U.S. Patent 3,250,629 wherein shirred casing sticks are packaged in hermetically sealed containers in contact with a moisture containing absorbent material containing a predetermined amount of moisture sufficient to humidify the casing to the desired level. The above described methods of humidification are typical of two of the commercially accepted methods that can be used. Other methods involve wetting the casing immediately before, during or immediately after the shirring step and then packaging the casing sticks into caddies to allow the moisture level to equilibrate.

In the manufacture of artificial sausage casing, the moisture content of the casing at various stages of preparation is extremely important. In a typical operation the regenerated cellulose tubing is dried to a moisture content of about 6–10%. This moisture level, in general, is maintained through the shirring, compacting and compressing operations to obtain a compactly shirred stick. During the stuffing operation where the casing is filled with meat emulsion, lengths of up to 160 feet of casing which have been compacted to about 20 inches are rapidly filled with meat emulsion during a time interval of 5–15 seconds. During this period the casing is subjected to many stresses and it has been found that moisture levels of 14–20% in the shirred casing stick, are generally most desirable.

In order to maintain these various moisture levels in the casing during various periods of preparation and storage, it has been the practice to shirr the casings at the low level of moisture of 6–10%, stopper one end of the casing for the automatic stuffing operation at this moisture level, and then package the shirred closed end casing in an apertured caddy such as described in U.S. Patents 3,028,952, 3,148,992 and 2,181,329. The casings in the caddies are then subjected to a stream of humidifying air through the apertures in the end wall of the casing to the desired point. In other embodiments in which the dry casing is packaged in caddies having a closed end vertical wall, the shirred casings are packaged into these caddies in the same manner as described above but are placed in contact with the moisture absorbent pulp or moisture absorbent material positioned in the caddies as described in U.S. Patent 3,250,629. The moisture absorbent pulp contains a predetermined amount of moisture sufficient to humidify the entire caddy of casing to the desired level.

In either embodiment, during humidification the shirred casing stick expands or grows longitudinally. If the caddy walls are rigid to prevent the longitudinal expansion and movement of the casing during its expansion or moisture absorption, the casing will tend to "snake" or curve from a straight condition during its expansion; that is, the body of the casing is laterally displaced and crooked. This causes breakage of the casing in the caddy upon its removal therefrom or difficulty in inserting the casing onto a stuffing horn whether by automatic or manual process. Methods have been proposed to minimize the growth effect by packaging the shirred dried casing in caddies which were ⅛–½ to one inch longer than the dried shirred stick thus permitting this space to be taken up with the expansion of the humidified casing and providing a degree of freedom to the casing during its expansion. Providing the freedom to the ends of the casing has minimized the "snaking" problem, but tends to accentuate another problem. Even in the embodiment where the last fold is tightly nested, since there is no restraining force on the last fold, it tends to become limp and migrate or fold over and thus may form an obstruction to the bore of the stick during humidification. Since this is the open end which is first sheathed onto the stuffing horn, jamming and breakage occurs when attempting to sheath or place the humidified stick onto the stuffing horn.

Typically, a regenerated cellulose tubing having a thickness of about 1 mil and a flat width of about 1.30 inch and a moisture content of 6–10% is shirred and compressed to contain 160 foot length into a shirred casing stick of about 20–21 inches in length. Upon release of the compression force, the shirred stick length grows or increases about ¼–¾ inch before it is put into the caddy. This shirred stick upon humidification to a moisture level of 14–20% and unrestrained, will further grow or increase in length about one-half to one inch.

An object is to provide a method for packaging shirred food casing and the package produced thereby which retains the bores of said shirred casing unobstructed and in straight alignment.

Another object is to provide a new and improved method of packaging artificial food casings which method allows for the expansion of the shirred casing during humidification and precludes distortion of the packaged shirring casing.

It is one object of this invention to provide a new and improved caddy for packaging shirred artificial food casings therein having a deformable member positioned against at least one end wall.

A further object is to allow for an improved method of easily removing shirred casing sticks from apertured or imperforate caddies.

Other objects and features of the invention will become apparent from the accompanying drawing and the following description.

The objects of the present invention are generally accomplished by providing a caddy having a deformable member positioned against at least one end wall of the caddy, in such a manner that one end of the shirred casings packaged therein is permitted to engage or contact said member and to be guided to expand into said deformable member, said deformable member acting to absorb and cushion the expanding ends of the shirred casings packaged in said caddy to retain the bore of the casing unobstructed and in straight alignment.

In a preferred embodiment, the shirred casings are positioned in the caddy with the last shirred end or open sheathing end in contact with the deformable member. In this manner the casing linear growth or expansion is permitted while retaining the last shirred fold or tab end firm and in position and to prevent is obstructing the bore of the stick.

From the practice of the present invention is will become quite apparent to those skilled in the art that the most preferred type of deformable member as well as its exact positioning in the caddy will be somewhat influenced by the casing size, initial and final moisture content, length, shirring treatment, method of humidification and other factors. Accordingly, from the teachings and the embodiments of the present invention set forth herein the artisan will appreciate that using simple empirical tests the optimum type and kind of deformable material can be readily ascertained to accommodate the influencing factors in each particular instance.

In one embodiment of the present invention, the resilient deformable and compressible material is a reticulated polyurethane foam, made by the process described in U.S. Patent 3,171,820, having a fully porous, sponge-like structure. The foam contains 20 pores per lineal inch and has a porosity such that air will pass through a 0.75 inch thick sheet at the rate of 350 feet per minute with a pressure differential of not more than 0.06 inch of water on each side of the sheet. A one inch cube of the material when compressed co-linearly under a load of 100 grams compresses and deforms about 0.2–0.3 inch and returns to at least to 0.9 inch in length upon removal of the load. All tests above being performed at about 70–80° F.

The deformable material acts as a cushion to maintain the last shirred piece of casing in position and to firm, support and cushion the shirred casing bore unobstructed and in straight alignment during its storage period in the caddy. Other foam, spongy, cushioning, or deformable material can be used which will impart the desired effect. Some examples of useful materials are vinyl, rubber, and polyurethane foams as well as regenerated cellulose viscose sponges and like compositions.

The cushioning or deformable material can also be used as the moisture reservoir for humidification. In this embodiment, the water absorptability and holding capacity are factors to be considered and regenerated cellulose sponges have been found useful.

Cushioning with deformable wall materials having high air porosity can be used with apertured caddies without modification. However, low air porosity deformable materials can be used by puncturing holes or apertures in the cushion in alignment with the caddy end wall apertures. This allows the humidifying air to pass through and about the casings as described in the prior art patents to Hewitt and Milio et al.

The cushioning or deformable member can be used on one or both end walls with either end or both ends of the shirred casing stick in contact with said member. Also the cushioning material can be additionally positioned on the vertical side walls as well as on the top and/or bottom of the casings.

It is preferred that the deformable or cushion material be such that it is acceptable for use in contact with food packaging materials. However, it is to be understood that a thin membrane or layer such as thin polyethylene film of about 0.5 mil can be adhered to the deformable member on the surface in contact with the food casings. In the embodiment wherein apertured caddies are used to humidify the casing, the membrane can be punctured to produce holes in alignment with the caddy end wall apertures. Other membrane materials such as non woven fabric cheese press cloth, paper, other plastics and the like can be used. Also coating materials can be used.

In the accompanying drawing, to be taken as part of this specification, there are clearly shown several preferred embodiments of this invention, in which drawing, FIGURE 1 is a perspective view of the apertured caddy of this invention with the top open and showing shirred casings in place, FIGURE 2 is a perspective view of the caddy of FIGURE 1 with the top closed ready for humidifying the packaged casings, FIGURE 3 is a fragmentary end view of the caddy of FIGURE 1 with some of the casings removed, FIGURE 4 is an enlarged sectional view taken along section 4—4 of FIGURE 3 showing the last shirred end of several casings before humidification, FIGURE 5 is an enlarged sectional view similar to FIGURE 4, but showing the casings after humidification, FIGURE 6 is a fragmentary end view of the caddy of FIGURE 1 showing another embodiment of the cushion end wall, FIGURE 7 is an enlarged sectional view taken along section 7—7 of FIGURE 6, showing the last shirred end of several casings after humidification, FIGURE 8 is a perspective view of another embodiment of the invention illustrating an imperforate caddy packaged in a moisture-proof wrapping, FIGURE 9 is a fragmentary end view of the caddy of FIGURE 8 with the wrapping removed, FIGURE 10 is an enlarged sectional view taken along section 10—10 of FIGURE 9 showing the last shirred end of several casings after humidification, FIGURE 11 is an enlarged fragmentary sectional view similar to FIGURE 4 of yet another embodiment illustrating both ends of several casings cushioned as they apepar before humidification.

Referring to FIGURE 1 of the drawing, there is shown a number of strands of shirred casings 2 packed into an apertured caddy with the top open. The caddy which is shown generally as a package 8 in FIGURE 2, has end panels 10, 11 in which are apertures 12. In FIGURE 3 apertures 12 are shown registered with the bores 3 of the shirred casings packed into the caddy and apertures 13 are shown registered with the space intermediate each group of four adjacent casings. FIGURE 4 illustrates an enlarged cross section of the last shirred end 4 (open sheathing end) of a shirred casing 2. The terminal portions of casing 2 are shown in half section to illustrate the folds or pleats in the shirred compressed stick, and particularly the last shirred or terminal fold 5. Terminal fold 5 may comprise a tab end of casing. In one embodiment of the invention a panel comprising deformable cushion 14 is fitted interiorly adjacent the caddy's end panel 10. The thickness of cushion 14 is preferably preselected to cradle the terminal fold 5 of the shortest shirred stick 2 when it is placed in caddy 8 thereby maintaining a firm sheathing end, and of a thickness to accommodate the maximum length after growth of any of the packaged sticks.

After the caddy is filled with shirred casing sticks, the top is closed and it is humidified by passing moist air through apertures 12, 13; through the bores 3 and outer surfaces of casing 2, and through the interstices of deformable cushion 14. During humidification, the casing expands longitudinally and deforms cushion 14 (FIGURE 5). Terminal fold 5 is urged against the last shirred end 4 of the casing stick as the stick grows in length by the incremental cradling effect of the deforming surface of cushion 14, thereby retaining fold 5 in position free of the bore 3 and producing a truly firm sheathing end of the stick.

In another embodiment of the invention (FIGURES 6 and 7) cushion 14 is provided with apertures 15 which are aligned with the bores 3 of the shirred casings packed in the caddy. During humidification, the moist air is passed through apertures 12, 15 and thorugh the bores 3 and also through apertures 13 and through apertures in the cushion in alignment thereof but not shown, to the outer surfaces of casing 2. Elongate panels 17, 18 of a deformable cushion material are filled longitudinally into the caddy to control the straightness of the sticks during humidification and aid in removal of the sticks from the caddy without breaking the sticks.

Because of manufacturing tolerances in flat width, wall thickness, and residual tension in the casing and variations in shirring and compression effects in the casing sticks, the length and nominal diameter of casings of the same commercial size may vary. Consequently, the side, top and end cushion panels of this embodiment serve to compensate for such variations and maintain straightness of the casing's bore and integrity of the casing stick.

In yet another embodiment of the invention (FIGURES 8 and 9) the shirred casing sticks 2 are packaged in an imperforate caddy shown generally as a package 20. This caddy has solid end panels 21, 22 and the casings 2 are packed into the caddy in contact with moisture absorbent sheets 26 containing a predetermined amount of moisture sufficient to humidify the casings to the desired level. After the moisture is added, the caddy is closed and is packaged in a hermetically sealed overwrap 24. Refer now to FIGURE 10. The terminal portions of casing sticks 2 are shown in half section typical of their position in cushion 14 after the added moisture has been absorbed by the casing 2.

In yet another embodiment (FIGURE 11) a panel of cushion material 14 is used to cradle the last shirred end 4 of the casing sticks and a panel of cushion material 16 is used to cradle the first shirred end 6 of these sticks. In shirred sticks retaining very long lengths of tubular casing such as 160 feet or more, which are shirred and compressed to 20–21 inches the true expansion of the sticks after total processing may vary from stick to stick and from the first shirred end 6 to the last shirred end 4 of a shirred stick and the use of multiple cushions in the caddy compensates for these variations and maintains straightness and integrity of the stick.

A package of shirred casings embodying this invention was made by first shirring 160 foot lengths of regenerated cellulose casing having a flat width of 1.30 inches, a thickness of 1 mil and a moisture level of about 12% into shirred casing sticks compressed to 20⅜ inches in length by the method described in Matecki U.S. Patent 2,984,574 and having the first shirred end stoppered.

A caddy as described in Milio et al. U.S. Patent 3,028,952 having an outer dimension of 21¾ inches in length, 5 inches in height and 9⅝ inches is width, was provided with a reticulated polyurethane foam member of 4¾ inches by 9¾ inches and ⅝ inch in thickness positioned against the inner wall of the apertured end wall.

The resilient, deformable and compressible member was reticulated polyurethane foam, made by the process described in U.S. Patent 3,171,820, having a fully porous, sponge-like structure. The foam contained 20 pores per lineal inch and has a porosity such that air will pass through a 0.75 inch thick sheet at the rate of 350 feet per minute with a pressure differential of not more than 0.06 inch of water on each side of the sheet. A one inch cube of the material when compressed co-linearly under a load of 100 grams compresses and deforms about 0.2–0.3 inch and returns to at least to 0.9 inch in length upon removal of the load. All tests above being performed at about 70–80° F.

Fifty shirred casing sticks were then aligned in parallel rows in the caddy with the sheathing or last shirred end in contact with the foam member or cushion. The ends of all the casing sticks were in contact with the deformable member. The caddy was closed and humidifying air was passed through the apertures in the vertical end panels as described in U.S. Patent 3,028,952, Milio. The humidifying air passed through the foam cushion and the casing moisture level was raised to about 18%. The package was then overwrapped with polyethylene film two mils in thickness.

After storage for one week the casing package was opened. The shirred casings were found to be all in straight alignment and neatly cradled in the foam cushion member. Removal and inspection of each of the casings were made. The bores of all shirred casing were in straight alignment and unobstructed and the sheathing or last shirred end were firm and fixed in position.

The caddy of this invention is also useful for packaging casings which are shirred and used at the same moisture level. In U.S. Patent 3,097,393, Matecki, there is described a method of producing shirred cellulose casings at moisture levels of 12 to 20%. It has been found that packaging these casings in a caddy having a deformable member at one end, and having the sheathing or open end of the stick at least in contact with the deformable member, that the integrity of the sticks including the sheathing ends are maintained as packaged.

Although the invention has been described using regenerated cellulosis sausage casings, it is to be understood that other casings can be used in the practice of this invention. Proteins, starches, carbohydrates and other natural synthetic casings which grow or extend in size after packaging such as collagen, cellulose esters and ethers, alginates and the like can be used.

It is to be further understood that other modifications and changes to the preferred embodiments of the invention herein shown and described can also be made by a person skilled in the art without departing from the spirit and scope of the invention.

What is claimed is:

1. A package article comprising, in combination:
   (a) a caddy;
   (b) a plurality of shirred, synthetic food casings packaged in said caddy such that the bores of said food casings are parallelly disposed with respect to each other, each of said food casings having at least one sheathing end; and
   (c) a deformable member positioned at at least one end wall of said caddy, said deformable member being characterized in that it is deformably resilient, and is effective to cushion and maintain the integrity of the sheathing ends of said packaged shirred, synthetic food casings.

2. The package article of claim 1 wherein the end wall of said caddy at which said deformable member is positioned contains apertures, a portion of which are aligned with the bores of said shirred food casings packaged therein and a portion of which are aligned with the areas between adjacent packaged synthetic shirred food casings.

3. The package article of claim 2 wherein the deformable member contains perforations positioned to align with the apertures in the end wall of said caddy.

4. The package article of claim 2 wherein the deformable member is capable of retaining moisture and exhibits a porosity sufficient to permit humidifying air to pass therethrough.

5. A method of packaging shirred synthetic food casings which includes the steps of:
   (a) aligning a plurality of shirred synthetic food casings which have at least one sheathing end in a caddy with the bores of said food casings disposed substantially parallel with respect to each other;
   (b) contacting at least the sheathing end of said shirred casings against a deformable member positioned at at least one end wall of the caddy; and
   (c) absorbing and cushioning the expansion of said food casings with said deformable member such that the bores of said food casings are retained in straight alignment and the integrity of the sheathing ends of said food casings is maintained.

6. The method of claim 5 wherein said casings are humidified prior to being placed in said caddy.

7. The method of claim 5 wherein the deformable member is capable of retaining moisture and exhibits a porosity sufficient to permit humidifying air to pass therethrough.

8. In a method of packaging shirred synthetic food casings the steps which comprise:
   (a) providing a caddy having a deformable member positioned at at least one end wall;
   (b) aligning a plurality of shirred synthetic food casings in said caddy with at least the sheathing end of said casings in contact with said deformable member such that said sheathing end is absorbed, cushioned and locked in place by the deformable member;
   (c) humidifying said food casings with humid air while they are in said caddy; and
   (d) closing said caddy to hold said casings in a relatively fixed position.

9. The method of claim 8 wherein said casings are humidified prior to being placed in said caddy.

10. The method of claim 8 wherein the deformable member is capable of retaining moisture and exhibits a porosity sufficient to permit humidifying air to pass therethrough.

References Cited

UNITED STATES PATENTS

| | | | |
|---|---|---|---|
| 3,062,663 | 11/1962 | Furgal et al. | 99—174 X |
| 3,250,629 | 5/1966 | Turbak | 99—176 |
| 3,271,168 | 9/1966 | Alsys | 99—176 |
| 2,979,246 | 4/1961 | Liebeskind | 229—14 |

HYMAN LORD, Primary Examiner

U.S. Cl. X.R.

229—14